United States Patent [19]
Cook, Jr.

[11] Patent Number: 5,647,254
[45] Date of Patent: Jul. 15, 1997

[54] BEVEL GEAR DRIVER AND METHOD HAVING TORQUE LIMIT SELECTION

[75] Inventor: Joseph S. Cook, Jr., Webster, Tex.

[73] Assignee: The United States of America as represented by the Administrator of the National Aeronautics and Space Administration, Washington, D.C.

[21] Appl. No.: 288,102

[22] Filed: Aug. 10, 1994

[51] Int. Cl.⁶ .................................................. B25B 23/157
[52] U.S. Cl. ...................................... 81/475; 81/467
[58] Field of Search ........................... 81/467, 473, 474, 81/475, 57.3, 57.29, 57.28, 57.31

[56] References Cited

U.S. PATENT DOCUMENTS

| | | | |
|---|---|---|---|
| 2,069,882 | 2/1937 | Hall | 81/57 |
| 2,576,069 | 11/1951 | Hoag et al. | 81/475 X |
| 2,781,682 | 2/1957 | Herndon | 81/52.4 |
| 3,845,673 | 11/1974 | Karden et al. | 74/751 |
| 3,905,254 | 9/1975 | Palatnick et al. | 81/57.3 |
| 4,272,973 | 6/1981 | Fu-Tsai | 81/475 X |
| 4,346,633 | 8/1982 | Rendl | 81/475 |
| 4,533,337 | 8/1985 | Schoeps | 464/25 |
| 4,653,359 | 3/1987 | Liao | 81/475 |
| 4,909,105 | 3/1990 | Namiki et al. | 81/57.36 |
| 4,966,319 | 10/1990 | Chang | 81/475 X |
| 4,989,478 | 2/1991 | Trivedi et al. | 81/57.36 |
| 5,092,410 | 3/1992 | Wallace et al. | 173/93.5 |
| 5,125,298 | 6/1992 | Smith | 81/57.37 |
| 5,437,524 | 8/1995 | Huang | 81/474 X |

Primary Examiner—D. S. Meislin
Attorney, Agent, or Firm—James M. Cate

[57] ABSTRACT

Methods and apparatus are provided for a torque driver including an axially displaceable gear with a biasing assembly to bias the displaceable gear into an engagement position. A rotatable cap is provided with a micrometer dial to select a desired output torque. An intermediate bevel gear assembly is disposed between an input gear and an output gear. A gear tooth profile provides a separation force that overcomes the bias to limit torque at a desired torque limit. The torque limit is adjustable and may be adjusted manually or automatically depending on the type of biasing assembly provided. A clutch assembly automatically limits axial force applied to a fastener by the operator to avoid alteration of the desired torque limit.

9 Claims, 7 Drawing Sheets

BEVEL GEAR DRIVER AND METHOD HAVING TORQUE LIMIT SELECTION

ORIGIN OF THE INVENTION

The invention described herein was made by an employee of the United States Government and may be manufactured and used by or for the Government of the United States of America for governmental purposes without the payment of any royalties thereon or therefor.

TECHNICAL FIELD

The present invention generally relates to threaded fastener drivers and methods that may be used with nut runners and screw drivers. More specifically, the present invention relates to a torque driver gear configuration with a torque-limit selection mechanism.

BACKGROUND ART

It is often desirable to select and apply torque to one or more fasteners, such as nuts, screws, or the like. Prior art methods, both manual and automatic, do not provide an uncomplicated mechanism that reliably limits the torque applied to a fastener to a selectable limit. For instance, "click-type" manual torque wrenches do not actually limit torque application but only provide an audible warning that the limit has been reached. As well, the useful life of automatic drivers is often limited. Automatic torque limiting devices may overheat due to friction or may become damaged due to high loads. The torque applied to each fastener by a torque driver ideally is readily adjustable to a calibrated value. Numerous prior art drivers have attempted to solve these problems.

U.S. Pat. No. 3,845,673 to Karden et al. discloses a two-speed nut runner that has a low torque clutch designed for disengagement at a predetermined, relatively low torque. A second, high torque clutch automatically takes over the transmission of torque at a lower speed and higher torque while holding the low torque clutch in a fully released position by means of a piston that is placed inside the output shaft of the nut runner.

U.S. Pat. No. 2,069,882 to W. Hall discloses a wrench for tightening a plurality of securing members that includes a plurality of rotatable spindles operable to transmit tightening forces to the securing members, and a transmission operable by a single drive to rotate the several spindles independently to tighten the members to the same degree of tightness. The transmission includes pinions associated with the spindles, and an element, rotated by the drive, operable to successively cooperate with pairs of substantially opposite pinions to partially rotate the same.

U.S. Pat. No. 2,781,682 to W. B. Herndon discloses a torque wrench with multiple spindles that provides a steady torque for setting screw-threaded fastenings while allowing the drive to slip when the fastening is tight.

U.S. Pat. No. 4,909,105 to Namiki et al. discloses an automated nut driving apparatus having a plurality of motors for rotating respective ones of a plurality of drive shafts to respective sockets holding nuts. The nut driver includes a plurality of universal joints connecting the sockets and drive shafts while allowing the sockets to be tilted with respect to the drive shafts. Universal joints are movable axially with respect to the drive shafts to allow the sockets to be retracted under reactive forces produced when the nuts engage the wheel attachment bolts.

U.S. Pat. No. 5,092,410 to Wallace et al. discloses a hydraulic torque impulse generator using a dual piston arrangement to provide impacts to a rotatable anvil. Automatic shut-off and control apparatus is provided for limiting the pressure without reversing the direction of the driving clutch cage. A pressure venting arrangement permits one impact per revolution.

U.S. Pat. No. 4,533,337 to K. C. Schoeps discloses a hydraulic torque impulse tool having a power inertia drive member, a hydraulic fluid chamber, and a cam driven piston in the fluid chamber for reciprocating movement.

U.S. Pat. No. 5,125,298 to C. O. Smith discloses an automatic wheel assembly line in which an array of fastener members is prepared, corresponding in number and geometric pattern to the array of coacting fastener members on the vehicle hub and to the array of bolt holes on the wheel assembly. The assembly includes a source of fasteners, a feeder mechanism having an outboard face, means defining a plurality of fastener receptacles, means operative to transport fasteners and means to move the loaded fasteners.

U.S. Pat. No. 4,989,478 to Trivedi et al. discloses an apparatus for tightening or loosening a plurality of bolts or other rotatable elements in which a drive socket and a pair of reaction sockets are supported by an elongated beam member.

U.S. Pat. No. 3,905,254 to Palatnick et al. discloses a tool for loosening and removing the lug nuts of an automobile and truck wheels with selectively positioned non-rotating stabilized sockets.

As can be understood from a review of the background as discussed above, there remains the need for an improved torque control mechanism that offers a selectable, calibrated control over torque applied to one or more fasteners, a simplified power driver construction that allows for hand-held operation, a long-life gear configuration, and a driver which may be produced at reduced levels of capital investment. Those skilled in the art will appreciate that the present invention provides solutions to these and other problems.

STATEMENT OF THE INVENTION

The present invention provides a method and apparatus for an improved torque controlled driver for applying torque to a fastener and having a driver housing with a first shaft supported by the driver housing and having a first shaft axis extending longitudinally therethrough. A first gear is carried by the first shaft for rotation about the first shaft axis. The first gear has first gear teeth mounted around a circumferential portion thereof. A second gear is disposed within the driver housing for displacement in a direction having a component substantially parallel to the first shaft axis. The displaceable gear moves between an engaged position and a disengaged position. A variable bias assembly is disposed substantially within the driver housing to bias the displaceable gear toward the engaged position. The variable bias assembly includes an external adjustment member extending outward of the drive housing for varying the bias.

The second gear has second gear teeth mounted around a circumferential portion thereof. At least one of the first and second gear teeth define a tooth profile that is angled to produce a separating force in response to torque transfer between the first gear and second gear for moving the second gear support member to the disengaged position to thereby limit torque transferred between the first and second gears and to the fastener.

In operation, torque is transferred from the first gear to the second gear and to the fastener. The first and second gears have respective first and second axes of rotation that are normally parallel with respect to each other. The teeth have an angled tooth profile on at least one of the first and second gears to produce a separating force between the first and second gears during the transfer of torque between the first and second gears with the separating force having a substantially parallel component with respect to the first and second axes of rotation. A desired torque limit for torque to be applied to the fastener is selected from a range of torques provided on the driver. The first gear is rotated to apply torque to the second gear and to the fastener until the separating force overcomes selected bias and separates the first and second gears to limit torque transfer between the first and second gears at the desired torque limit.

An object of the present invention is to provide an improved torque driver.

Another object of the present invention is to provide a torque driver with a convenient selection mechanism for a specific torque setting.

Yet another object of the present is to provide a torque driver that is conveniently compact.

A feature of the present invention is an axially displaceable conical gear.

Another feature of the present invention includes angled teeth used to produce a separating force to thereby move an axially displaceable gear and limit transferred torque.

Yet another feature of the present invention is a clutch to prevent torque transfer to a fastener.

An advantage of the present invention is that it provides an uncomplicated, economical construction for long gear life.

Another advantage of the present invention is a construction that allows the driver to be adapted for working with a wide variety of fasteners.

Another advantage is the ability to provide a means to prevent axial force applied by an operator from significantly affecting the select torque output.

Other objects, features and intended advantages of the present invention will be readily apparent by the references to the following detailed description in connection with the accompanying drawings and claims.

While the present application specifically claims embodiments shown in FIG. 5–8A, the remaining figures include information necessary for a complete understanding of the invention and the possible variations of embodiments which the claims are intended to describe. Thus, claims directed to a driver with gears displaceable in a direction having a parallel component with respect to the gear axes are not intended to exclude all devices which may have a lateral component of movement between the gears. FIG. 1–4 and FIG. 9–10 show a purely lateral movement between gears with respect to their gear axes and the embodiments of the present invention may be modified in accordance thereto to include some lateral component of movement as will be understood by those skilled in the art after studying the teachings of this specification.

Thus, while the invention will be described in connection with the presently preferred embodiments, it will be understood that it is not intended to limit the invention to these embodiments. On the contrary, it is intended to cover all alternatives, modifications, and equivalents as may be included in the spirit of the invention.

DESCRIPTION OF THE PREFERRED EMBODIMENTS

The present invention relates to an improved torque driver mechanism operable to transmit a precisely controllable degree of torque to a driven member such as a nut, screw, or the like. The torque driver may receive an input torque which is greater than a desired output torque and is operable to limit the input torque to the desired output torque level.

In very general terms, the application of gears for torque transmission between shafts falls into three categories of (1) parallel shafts, (2) shafts with intersecting axes, and (3) shafts neither parallel nor intersecting but skew.

While the present application specifically claims embodiments shown in FIG. 5–8A, the remaining figures include information necessary for a complete understanding of the invention and the possible variations of embodiments which the claims are intended to describe. Thus, claims directed to a driver with gears displaceable in a direction having a parallel component with respect to the gear axes are not intended to exclude all devices which may have a lateral component of movement between the gears. FIG. 1–4 and FIG. 9–10 show a purely lateral movement between gears with respect to their gear axes and the embodiments of the present invention may be modified in accordance thereto to include some lateral component of movement as will be understood by those skilled in the art after studying the teachings of this specification.

Figure 1:
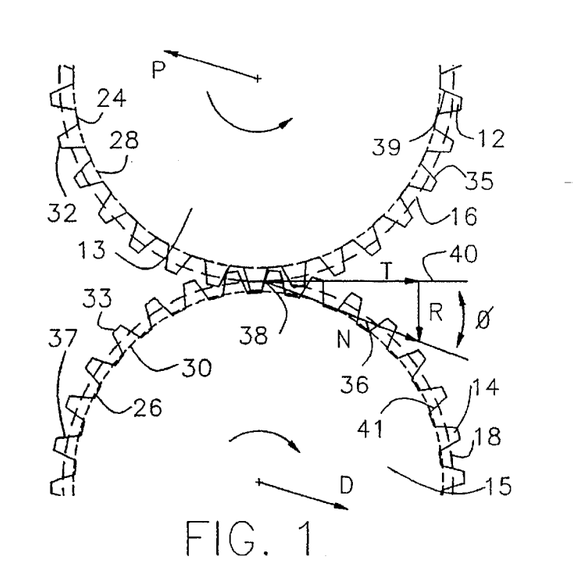
FIG. 1 is a schematic representation showing reaction forces and principal features with a pinion (driver) and driven gear.

The basic gear forces involved in operation of a torque driver in accord with the present invention are best described in connection with FIG. 1 wherein gear teeth 12 and 14, on respective gears 13 and 15, are shown in some detail. Respective gear teeth 12 and 14 provide a positive drive, maintaining exact velocity ratios between pinion or driver gear 13 and driven gear 15 to positively rotate one fastener, or more than one fasteners simultaneously, up to the desired torque.

Pitch circles, 16 and 18, are generally defined as the circles whose periphery is the pitch surface, or surface of an imaginary cylinder that would transmit by rolling contact, the same motion as toothed gears 13 and 15. Motion transmitted between gears 13 and 15 is similar to that of rolling surfaces identical with the gear pitch surfaces, but the action of gear teeth 12 on gear teeth 14 is generally a combination of rolling and sliding motion.

The radial distances between bottom lands 24, 26 and respective pitch circles 16, 18 is referred to as the respective dedendums. Circles 28, 30 are the base circles of pinion 13 and driven gear 15 that are generally defined as the circle from which an involute tooth curve is generated. The addendum circle (not shown) is the circle connecting the top lands 32, 33 of teeth 12, 14 and the corresponding radial distance to pitch circles 16, 18 is the addendum. Faces 35, 37 are the surfaces of teeth 12, 14 radially outwardly of pitch circles 16, 18. Flanks 39, 41 are the surfaces of teeth 12, 14 radially inward of pitch circles 16, 18.

Pitch point 38 is the point at which pitch circles 16 and 18 are tangent and this is typically the only point where contact between the teeth is pure rolling contact depending on the teeth profiles which may be of numerous types or modified types including involute, involute stub tooth, cycloid, American Standard spur gear tooth forms, and the like, made by different methods including hobbing, shaping, milling, pre-shaving, and the like.

Each pair of teeth has its points of contact co-linear with pressure line 36. The angle φ between pressure line 36 and tangent line 40 is the pressure angle. Force P is the reaction force on bearings of pinion 13 and force D is the reaction force on bearings of driven gear 15. Force N is the force normal to tooth profiles at the pitch line. Force T is the tangential or driving force. Force R is the radial or separating force.

While tangential force T is used to produce output torque, radial force R is often considered a wasteful byproduct. However, force R is used to control output torque by automatically disengaging the gear at a specified torque.

When the fastener is tightened to the specified torque, the radial force R at the engaged teeth equals a bias force, discussed hereinafter that urges pinion 13 and driven gear 15 into engagement. Any higher torque causes gears 13 and 15 to move laterally away from each other in this embodiment of the invention.

As gears 13 and 15 move laterally away from each other, pressure angle φ typically increases depending on the gear teeth profile (such as the frequently used involute or modified involute gear teeth profiles) causing a decrease in tangential force T (and output torque) and an increase in radial force R to thereby facilitate additional displacement. Thus, the separation process typically accelerates to completion rapidly after it first begins.

After gears 13 and 15 are displaced by the working depth (sum of the addendums of the teeth 12 and 14), pinion 13 is disengaged. Pinion 13 continues to turn and biasing will cause pinion 13 to re-engage with the next set of teeth. The process of displacement and disengagement continues until input torque is removed. In this manner, the torque applied to the threaded fastener is limited to the specified torque.

Figure 2:
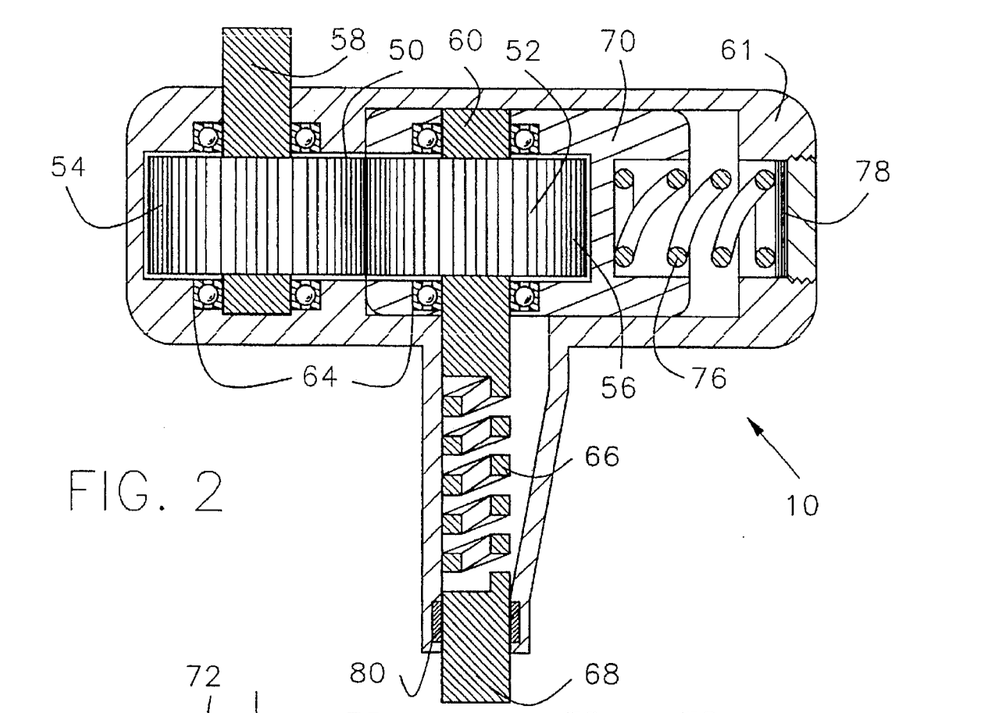
FIG. 2 is an elevational view, in section, of a torque driver with gears in engaged position.
Figure 3:
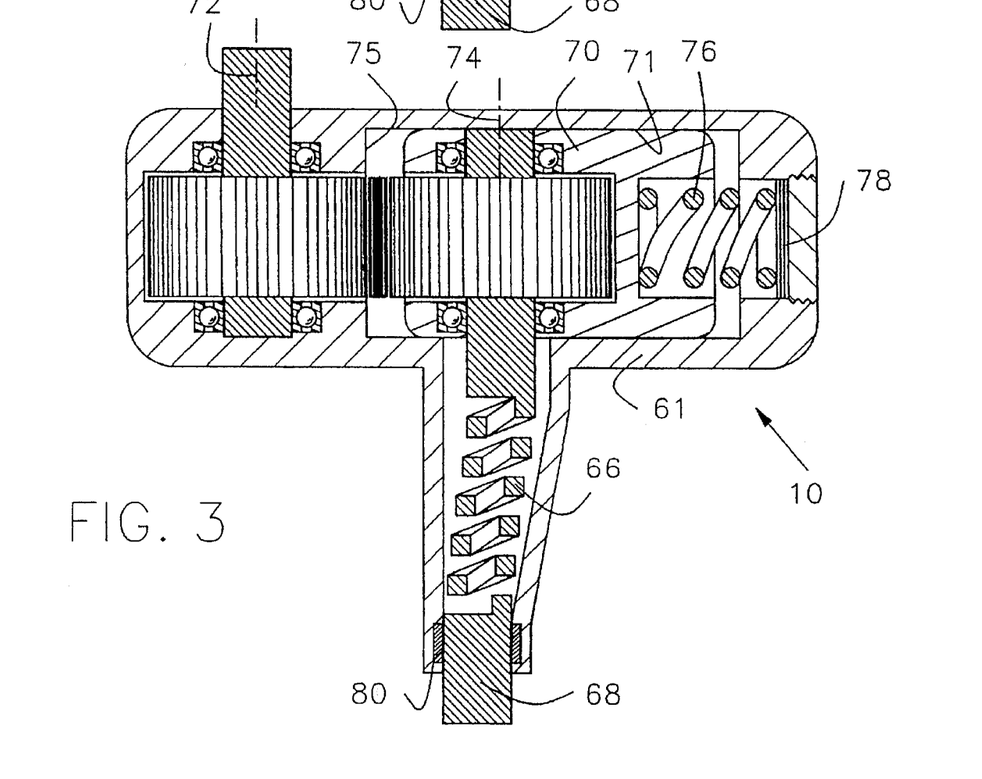
FIG. 3 is an elevational view, in section, of the driver of FIG. 2 with gears displaced from each other.

FIG. 2 and 3 show how this principle is applied for use with spur gear driver 10. Spur gears are generally considered to be those gears that transmit torque between parallel shafts and may have straight teeth parallel to the gear axis or helical or herringbone teeth patterns and may include external, internal, and rack and pinion type configurations. Gears 50 and 52 are external spur gears with teeth 54 and 56 which point outwardly from shafts 58 and 60, respectively. Gears 50 and 52 and other components discussed hereinafter are preferably mounted in driver housing 61 with antifriction bearing assemblies such as ball-bearing assemblies 64 or other types of antifriction bearing assemblies as desired. Various bearing assemblies may be used with the rotating components as desired. Thus, while various sliding surfaces may be shown or discussed herein without specifying types of antifriction bearings, or indicating the presence of bearing surfaces in the associated drawings, it will be understood that those skilled in the art will be aware of the need to supply the same where desired.

As well, various types of lubrication may be used for any sliding surfaces discussed or shown herein. For instance, self-lubricated teflon coated or impregnated bronze surfaces may be used for relatively sliding components. Other suitable coating materials could be used for self-lubricated surfaces on the various components shown and discussed herein as are known to those skilled in the art. Those skilled in the art will recognize that many methods for lubricating any relatively sliding surfaces that are discussed herein. For instance, the various chambers and suitable elements may be flooded with oil. Pneumatic biasing systems, as discussed hereinafter, may be circulated through oil baths for air lubrication. It is also to be understood that antifriction means include lubricants and self-lubricating materials that may be used on the various relatively sliding components discussed and shown herein.

Input shaft 58 is preferably connected to an input torque source (not shown) that supplies torque at a higher level than the preferred specified output torque limit from shaft 60. The input torque source may include a manual ratchet wrench, electric drill, pneumatic motor or the like. Output shaft 60 is connected through flexible linkage or coupling 66 to output shaft attachment 68 which is then coupled to a fastener (not shown).

Flexible linkage 66 preferably has a coil configuration that is flexible in all directions and may be obtained commercially with specified coil configurations, windup, spring rates, special end connections, axial offsets, bending angle features, and other specified features, from companies such as Helical Products Company, Inc. Flexible linkage 66 could also be provided with U-joints and constant velocity splines (not shown), or other linkage components including combinations of components including a coiled linkage as desired. However, coiled linkage 66 is presently preferred for simplicity, lower cost, and ease of construction and maintenance. As well, flexible linkage 66 may be disposed in an angled, rounded, or other configuration as desired to tighten fasteners located in difficult to reach positions.

Driven gear 52 and shaft 60 are mounted for rotation in displaceable support member 70. Displaceable support member 70 is laterally displaceable in a direction transverse to input shaft axis 72 which, in this embodiment, is parallel to output shaft axis 74. Displaceable support member 70 moves laterally with respect to pinion 50 within chamber 71 of driver housing 61 between an engaged position and a disengaged position shown, respectively, in FIG. 2 and FIG. 3. Displaceable support member 70 may have various cross-sectional shapes such as, but not limited to, circular, elliptical, or square shapes.

Displaceable support member 70 and its related bearings 64 for supporting shaft 60 are loaded by compressed spring 76 to produce a biasing force that tends to move displaceable support member 70 towards pinion 50. To control the specified level of torque limit, the level of the bias, or other factors discussed hereinafter, may be adjusted.

The required bias can be obtained from geometrical relationships using the gearing configuration that includes e.g. effective gear radius and pressure angle. Various sizes and combinations of gears may be selected based on the particular requirements, speed, and so forth of the application. Load adjustment shims 78 or other means such as a moveable adjustment plug (not shown) may be used to adjust the bias to the desired level. Thus, spring bias, or other types of bias, may be either preset or adjustable.

A preset version can be used, for instance, with critical assembly operations where the operator needs only one torque setting. An adjustable version, which could be manually or automatically adjustable, could be used for a wider assortment of operations when multiple torque settings are needed.

The input torque source (not shown) rotates input shaft 58 and also rotates pinion 50, which is secured to input shaft 58 for rotation therewith. When the fastener is tightened to the specified torque limit, the separating force at engaged teeth 54 and 56 equals the biasing force. Higher torque causes driven gear 52 to move laterally away from pinion 50. As driven gear 52 moves laterally away from pinion 50, the pressure angle increases as discussed hereinbefore, causing a decrease in tangential force T (and related output torque) and an increase in radial or separating force R to facilitate lateral movement of displaceable support member 70 toward a disengagement position shown in FIG. 3.

After driven gear 52 is displaced by its working depth to disengage from pinion 50 as shown in FIG. 2, pinion 50 continues to rotate. Spring bias 76 then biases displaceable support member 70 to move driven gear 52, which is substantially no longer rotating, into engagement with the next set of teeth 54 on pinion 50. The process of displacement and disengagement repeats until input torque is removed.

Flexible linkage 66 remains connected to the fastener throughout the torque sequence and adapts for movement of displaceable support member 70. Adapter 68 is preferably rotatably secured, with a bearing assembly 80, to driver housing 61 so that adapter 68 rotates but is axially fixed with respect to housing 61, at least in the embodiment of FIG. 2 and FIG. 3. Bearing assembly 80 may be of several types and shapes but is preferably used to prevent radial forces that could interfere with loading of displaceable support member 70 and thereby provide more accurate torque limiting action. See discussion of bearings and lubrication hereinbefore.

The design selection of pinion 50 and driven gear 52 requires consideration of such factors as pressure angle, contact ratio (ratio of length of path two gear teeth are in contact to base pitch), teeth depth, radii, tooth profile, and the like chosen for the particular application.

Figure 4:
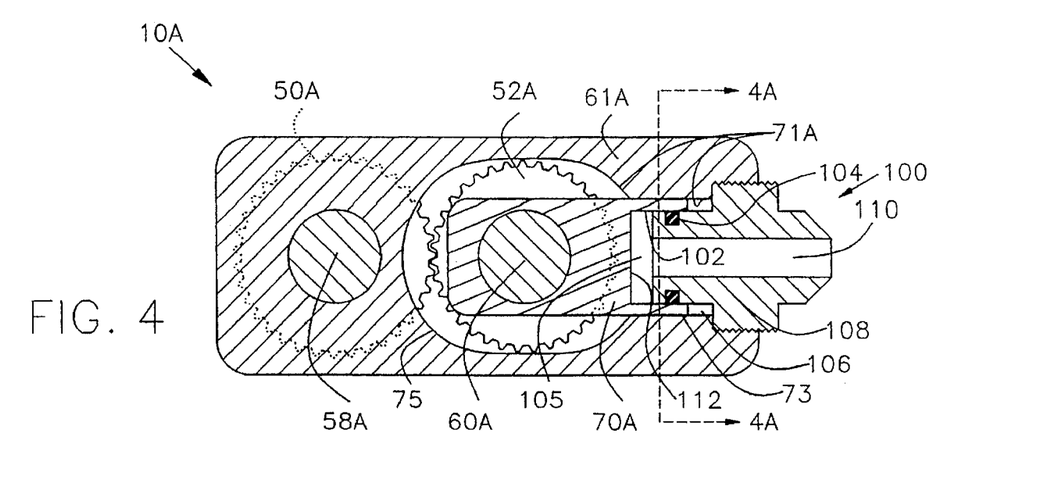
FIG. 4 is a top view, in section, of a driver according to FIG. 2 but with a pressurized cylinder biasing assembly.
Figure 4A:
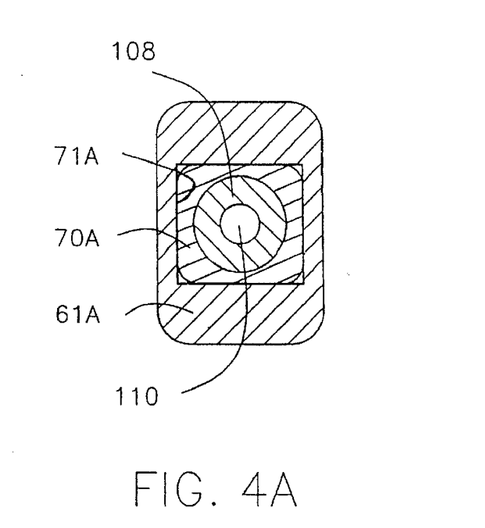
FIG. 4A is a side view, in section, of the driver of FIG. 4 along the line 4A—4A.

FIG. 4 and FIG. 4A show a top view of alternative embodiment driver 10A that is substantially the same as driver 10 except for an alternative pneumatic biasing assembly 100. Components with substantially identical counterparts in driver 10 are labeled with an "A" suffix and reference may be made to the earlier discussion for those components so labeled.

As with driver 10, displaceable support member 70A moves within cavity 71A between an engaged and a disengaged position. Cavity 71A has a first section 73 that has a substantially consistent rectangular cross-Section along its length in which a rectangular portion, as shown in FIG. 4A, of displaceable support member 70A moves. It will be understood that this cross-section could also be cylindrically, elliptically, or otherwise configured as desired. As with driver 10, cavity 71A also has an expanded portion 75 which allows lateral movement of driven gear 52A within cavity 71A.

Sealed cavity 102 is preferably cylindrically shaped and is preferably sealed with sealing elements such as O-ring 104 and lubricated to reduce friction. As displaceable support member 70A moves between its engaged and disengaged position, the volume 105 of sealed cavity 102 and also cavity 106 varies accordingly. Piston 108 is threadably secured to driver housing 61A but is moveable relative to displaceable support member 70A.

Passageway 110 through piston 108 interconnects cavity 102 to a preferred constant pressure pneumatic source, discussed hereinafter with respect to FIG. 5, to maintain a constant pressure within cavity 102 and thereby produce a constant biasing force on wall 112 of cavity 102.

A constant pressure pneumatic biasing source of this type is inherently more accurate than a spring bias for several reasons. The spring bias tends to have a relatively larger tolerance variation in spring pressure over relatively short distances than a pneumatic bias assembly.

As well, the spring bias increases and decreases with compression and expansion to adversely affect torque limiting accuracy. Even though the pressure angle between the gear teeth typically increases to thereby increase the radial or separating force after the desired torque is reached, the spring bias force also increases with respect to the bias force of the engaged position to inhibit the desired slippage operation between pinion 50 and driven gear 52. With a constant pressure bias, the movement towards the disengaged position occurs more rapidly.

Thus, the constant pressure biasing assembly 100 produces a constant bias even as displaceable support member 70A moves laterally with respect from pinion 50A between an engaged position and a disengaged position. As the pressure angle changes and the radial force increases, the load on displaceable member 70A remains constant to correspond to the specified output torque. Preferably, a calibration record is obtained to measure cavity pressure versus output torque so as to provide an accurate calibration of each machine. Thus, torque control level may be set with a sufficiently accurate pressure gage having sufficient resolution to be calibrated in terms of the desired torque limit and tolerance required thereof.

Various configurations of pressurized cylinder-piston assemblies with related seals and shafts may be used with that shown in FIG. 4 being a presently preferred configuration. The bias force produced to act against displaceable support member 70A is a function of piston/cylinder geometry (e.g. internal diameter and pressure). Maintaining a constant pressure in the cylinder ensures that during lateral displacement of gear 52A towards or away from pinion 50A, the bias will always remain at the preset level which corresponds with the specified torque output.

Figure 5:
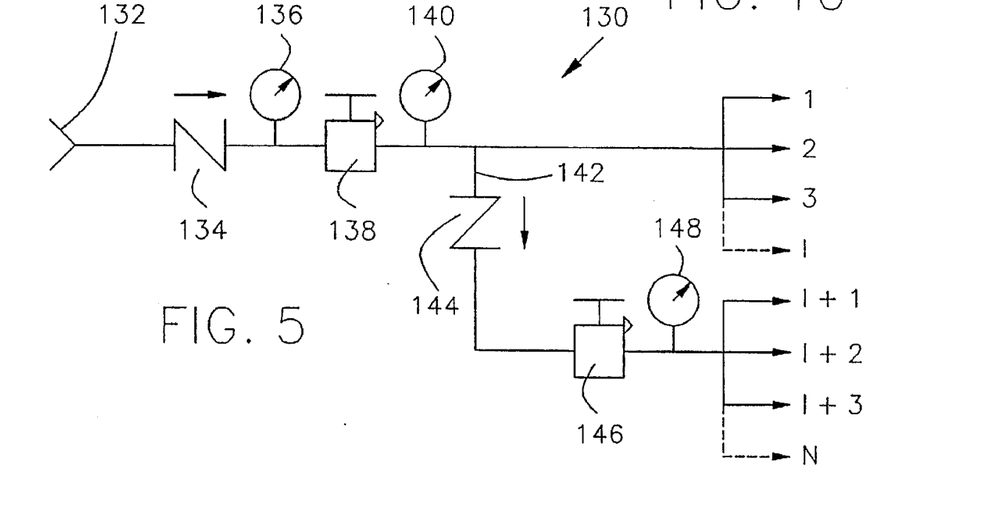
FIG. 5 is a schematic representation of a self-venting pressure bias control system.
Figure 9:
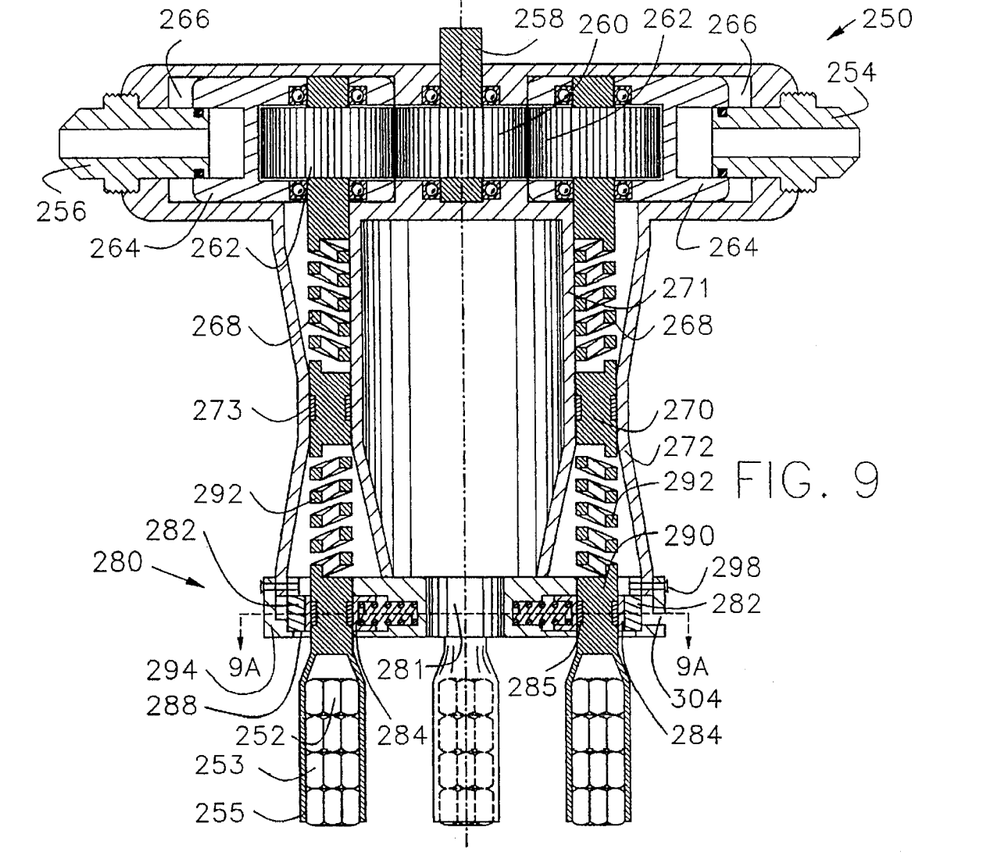
FIG. 9 is an elevational view, in section, of a spur gear driver with adjustable fastener driver configuration.
Figure 10:
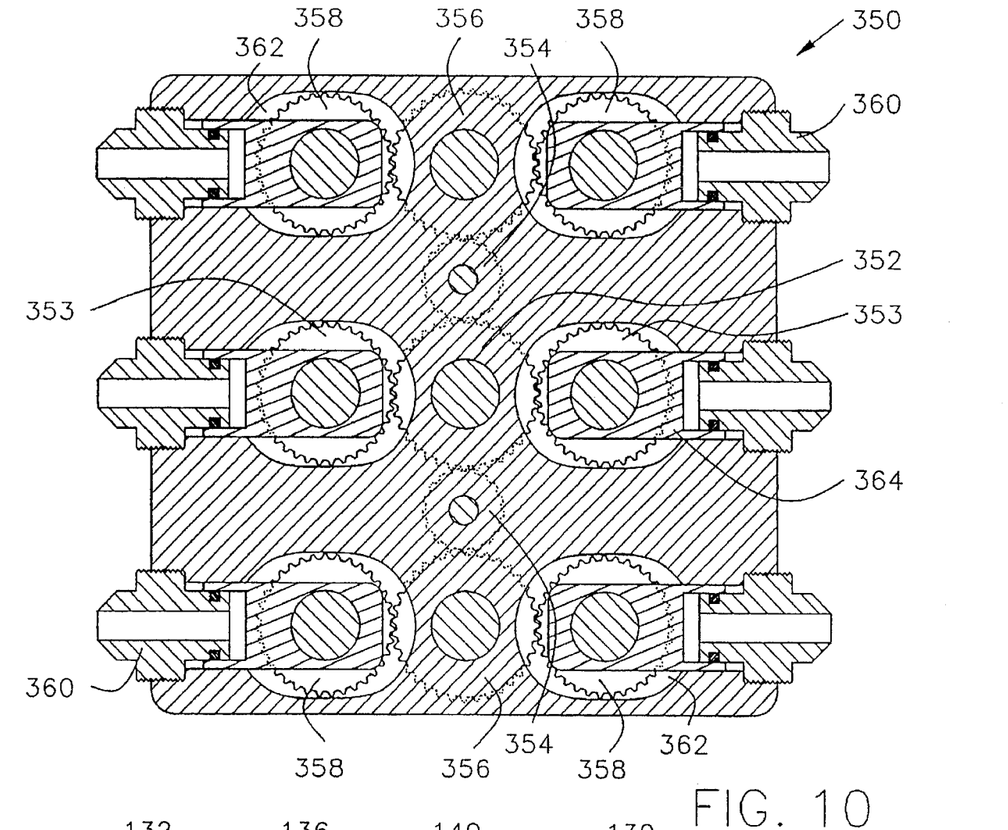
FIG. 10 is a top view, in section, of a driver for a non-circular fastener configuration.

FIG. 5 discloses a schematic of a self-venting pressure regulator system 130 that relieves downstream pressure at two different desired setpoints for applying different, but readily adjustable, torque limits to different threaded fasteners in a configuration of fasteners. The multiple fastener torque drivers shown in FIG. 9 and FIG. 10 are examples of drivers that may require such adaptability. System 130 could also be used to supply constant pressure to a single driver such as that of FIG. 4 or FIG. 8 or could be modified to provide for more than two different torque limits if desired. Safety devices such as relief valves (not shown) may be used therein as desired e.g. in the supply line.

Pressurized air enters inlet 132 and is regulated by first check valve 134. Pressure indicated at first pressure gage 136 will preferably be higher than subsequent output pressures at outlets 1 through N. Adjustable self-venting pressure regulator 138 may be used in conjunction with gage 136 to set a desired pressure corresponding to a desired torque level at outputs 1 through I one of which could be connected, for instance, to passage 110 of FIG. 4. The letter I indicates that as many connections as desired up to the limits of the system may be used.

To obtain a second selective torque limit, the pneumatic line branches at 142 to second check valve 144. The output of second check valve 144 goes to second adjustable self-venting pressure regulator 146 that may be adjusted in accord with gage 148 to obtain a second pressure output at outputs I +1 to N. While system 130 is a particular pressure supply system, other systems may also be used. The outputs of system 130 may be ramped, sequenced, or otherwise varied to control torquing of fasteners in a desired manner. Even while pressure is relatively slowly ramped, it will be understood that the pressure within a piston/cylinder assembly remains substantially constant during the short time in which a laterally or axially displaceable gear moves from an engaged to a disengaged position.

Figure 6:
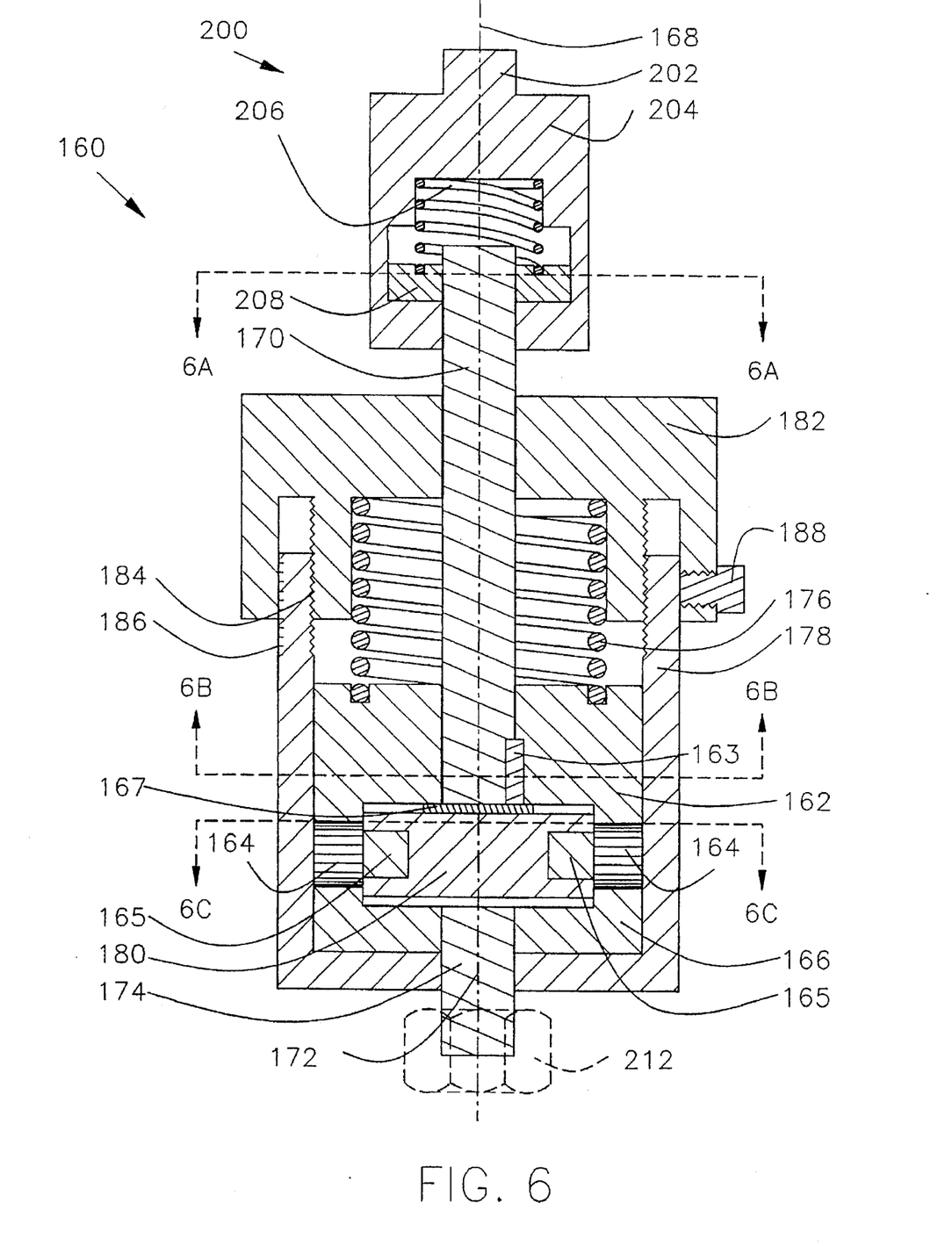
FIG. 6 is an elevational view, in section, of a bevel gear driver.
Figures 6A, 6B, 6C, 7, 7A:
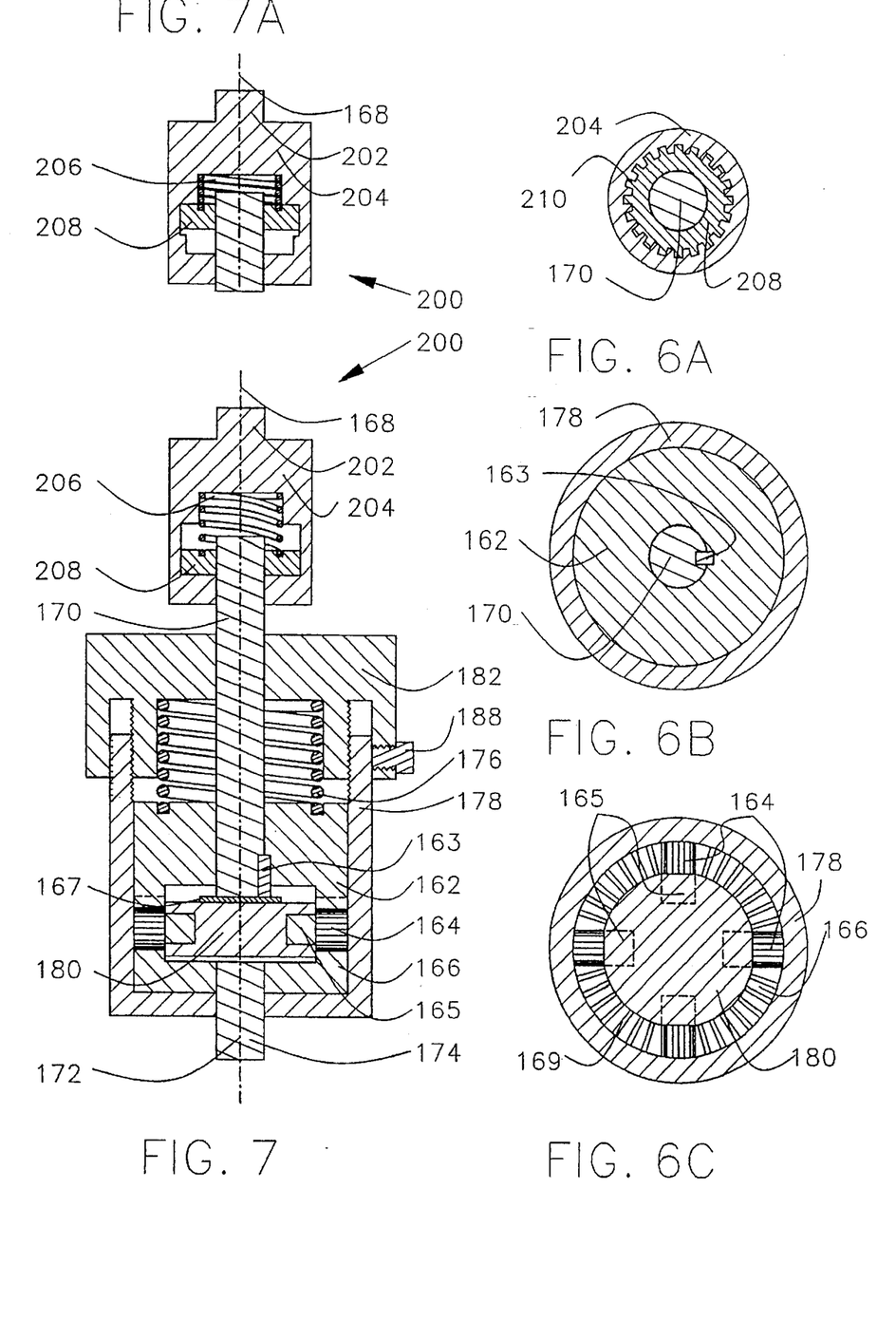
FIG. 6A is a sectional view of the driver of FIG. 6 along the lines 6A—6A.
FIG. 6B is a sectional view of the driver of FIG. 6 along the lines 6B—6B.
FIG. 6C is a sectional view of the driver of FIG. 6 along the lines 6C—6C.
FIG. 7 is an elevational view, in section, of the driver of FIG. 6 with gears displaced.
FIG. 7A is an elevational view, in section, of the axial force clutch of FIG. 6 in the disengaged position.

FIG. 6 and FIG. 7 discloses a conical or bevel gear driver 160 having an adjustable bias configuration. Driver 160 operates on a similar principle as that illustrated in FIG. 1 of loading a displaceable gear to control output torque. However, the bevel gear configuration of driver 160 has an axial load scheme such that the displacement occurs axially, with respect to a gear shaft axis, rather than radially with respect to a gear axis, as with the spur gear arrangement. In the embodiment illustrated, the input gear or drive gear is displaceable rather than the output or driven gear.

Bevel or conical gears are normally those which may be used to change the shaft axis direction or to change shaft speed as well as direction. Bevel gears include many variations such as external bevel gears, internal bevel gears, crown gears, straight bevel gears, spiral bevel gears, zero bevel gears, and the concept of operation of this embodiment of the invention, as discussed hereinafter, could conceivably be developed with hypoid gears and worm gears which are therefore also considered, for the purposes of this application, to come under the general term of bevel gears.

Bevel driver 160 includes three basic gear assemblies including displaceable gear 162, intermediate gears 164, and output gear 166. Displaceable gear 162 is axially displaceable in a direction parallel to axis 168 of input shaft 170 and axis 172 of output shaft 174. Displaceable gear 162 is biased into engagement with intermediate gears 164 by biasing spring 176. Key 163, shown also in FIG. 6B, rotationally secures displaceable gear 162 with respect to input shaft 170 but permits axial movement therebetween. Thrust bearing 167 is preferably connected to the lower end of shaft 170 for support, to reduce play, and to reduce friction between shaft 170 and disc 180 during rotation.

While gear 162 is shown as a monolithic component, it could be comprised of an assembly of components including bearings, discs, and so forth. The gear train of the bevel gear driver 160 could also be arranged so as to be angled if desired as may be necessary to apply torque to fasteners located in difficult to reach positions.

The components of driver 160 are mounted within cylindrical driver housing 178. Various types of bearings may be used between driver housing 178 and any movable components such as in the gear train as well as between the shafts and the supporting members (see general discussion of bearings and lubrication above).

Shafts 165, shown also in FIG. 6C for intermediate bevel gears, are preferably held in their respective positions with respect to driver housing 178 i.e. their associated shaft axes are fixed with respect to driver housing 178. They may be pinned to driver housing 178, held by internal slots within driver housing 178, or otherwise affixed thereto. As well, disc 180, which supports intermediate gears 164 and their related shafts 165, may be fixed by pins or other means to secure disc 180 in position with respect to driver housing 178. Because the axes of shafts 165 are fixed with respect to housing 178, bevel gears 164 may be used to rotate output gear 164 via output gear teeth 169 (see FIG. 6C) in response to rotation of displaceable input gear 162. Thrust bearing 167 may be provided to reduce friction and play between disc 180 and shaft 170.

Cap 182 holds the internal components of driver 160 within driver housing 178 and may be threadably secured thereto, as shown, with fine adjustment micrometer type threads 184. Fine adjustment threads 184 allow bias, and therefore torque limit, to be adjusted by rotation of cap 182. Driver 182 may be calibrated so that torque indication marks 186 provide a direct reading of the selected torque limit for driver 160. Lock nut 188, or other locking means, may be used to fix cap 182 with respect to driver housing 178 and maintain a selected torque limit.

Driver 160 also includes axial load control or clutch assembly 200 that comprises input attachment 202, attachment housing 204, axial load control spring 206, and splined drive disc 208. As shown in FIG. 6A, spline-groove interfaces 210 between drive disc 208 and attachment housing 204 are engaged to transmit torque to input shaft 170. The spline-groove interfaces disengage in the manner shown in FIG. 7A to prevent torque transmission if axial force applied, as by an operator, is greater than a selected amount. As discussed hereinbefore, spline-groove interfaces 210 may be self-lubricated or otherwise lubricated as desired.

Input shaft 170 is fixably secured to drive disc 208 by means not shown such as welds, pins, threads, snap-rings, or other means. Axial load control or clutch assembly 200 therefore acts to prevent excessive axial load being applied to the fastener through driver 160. Excessive axial load could alter bias applied with spring 176 to thereby change the selected torque limit.

If the axial load is greater than a selected amount, attachment housing 204 moves towards cap 182 to thereby disengage drive disc 208 with respect to attachment housing 204 as shown in FIG. 7A. This action prevents torque transmission to shaft 170. As well, it is noted that clutch 200 could be positioned elsewhere along the shaft and gear assembly prior to connection with fastener 212 to prevent torque transmission to fastener 212.

In operation, torque applied through input shaft 170 is transmitted through output shaft 174 to fastener 212. If an operator presses too hard on the fastener 212 with driver 160 then clutch 200 disengages torque to prevent any torque transmission to fastener 212. Otherwise, torquing of fastener 212 continues until a desired torque limit is reached as indicated by calibration marks 186. At that point, displaceable gear 162 moves upwardly with respect to intermediate bevel gears 164, as shown in FIG. 7, to a disengaged position. The next set of teeth on displaceable gear 162 will then re-engage bevel gears 164 due to bias spring 176, or other bias mechanism, and the process repeats until torque is removed from input attachment 202.

FIG. 6C shows four bevel gears with a fixed and equidistant circumferential spacing with respect to driver housing 178 and driven gear 166. Other numbers of bevel gears could be selected based largely upon the anticipated torque-related stress to be carried by each of bevel gears 164. Thus, in some applications three bevel gears in an intermediate bevel gear assembly may be sufficient to handle the anticipated torque requirements. The multiple number of bevel gears 164 provide additional durability because wear between the multiple gears carrying the torque reduces wear which would otherwise occur between a single driver-driven gear arrangement.

In addition to increasing torque adjustment accuracy, the bevel gear assembly is relatively inexpensive, is easy to manufacture, and provides opportunity for considerable flexibility of tooth profile design for the intended slippage type operation and/or for angled operation of the driver.

Figure 8:
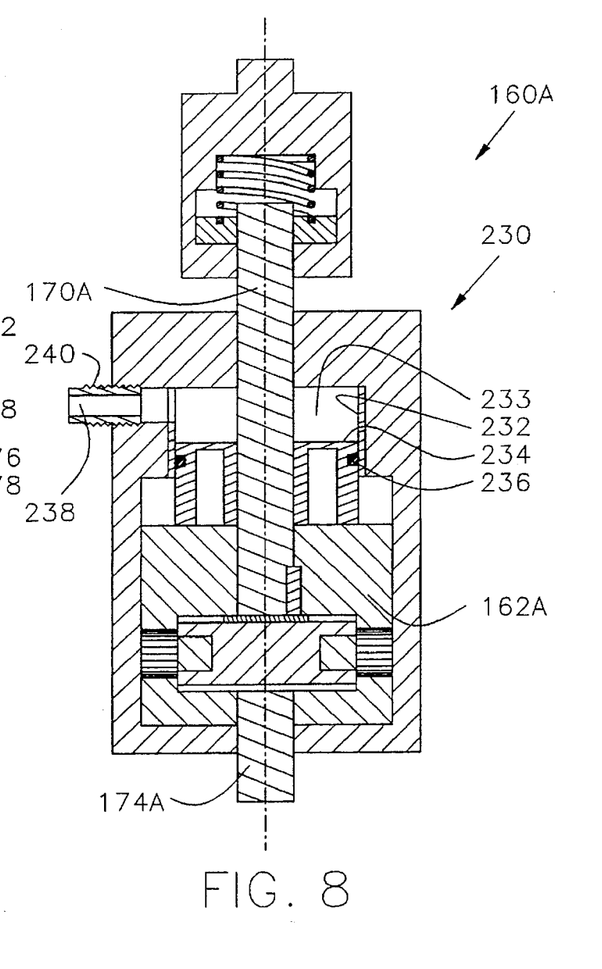
FIG. 8 is an elevational view, in section, of a bevel gear driver with pneumatic bias.

FIG. 8 provides an alternative bevel gear driver configuration 160A with pneumatic biasing assembly 230. Pressurized cylinder sleeve 232 contains pressurized fluid, preferably gas held at a constant pressure in variable volume cavity 233, as discussed hereinbefore, to produce a biasing force against piston 234. Piston 234, in turn, acts against displaceable gear 162A in the manner discussed hereinbefore.

Seal 236, an O-ring seal, or other types of seals may be used to seal cavity 233 from air leakage. For instance, grease from grease inserts, grease wicks, or other sources may act to form suitable seals and simultaneously lubricate relatively close fitting bearing surfaces around shafts 170A and 174A.

Pressurized gas preferably passes through passageway 238 of connector 240 to cavity 233. For best accuracy, pressurized gas will be from a constant pressure regulated air supply, such as system 130 shown in FIG. 5, or other constant pressure regulated fluid supply systems. A sufficiently accurate pressure gage may be calibrated and operated with a vented pressure regulator to set driver 160A at a desired torque limit.

As explained hereinbefore with respect to driver 10A shown in FIG. 4 and FIG. 4A, a constant pressure used with a pressurized cylinder, as shown in FIG. 8, creates a constant bias that is more accurate than a spring bias. The spring bias increases with distance and may also have significant bias force tolerances that limit accuracy and thereby affect the desired torque level.

Figure 8A:
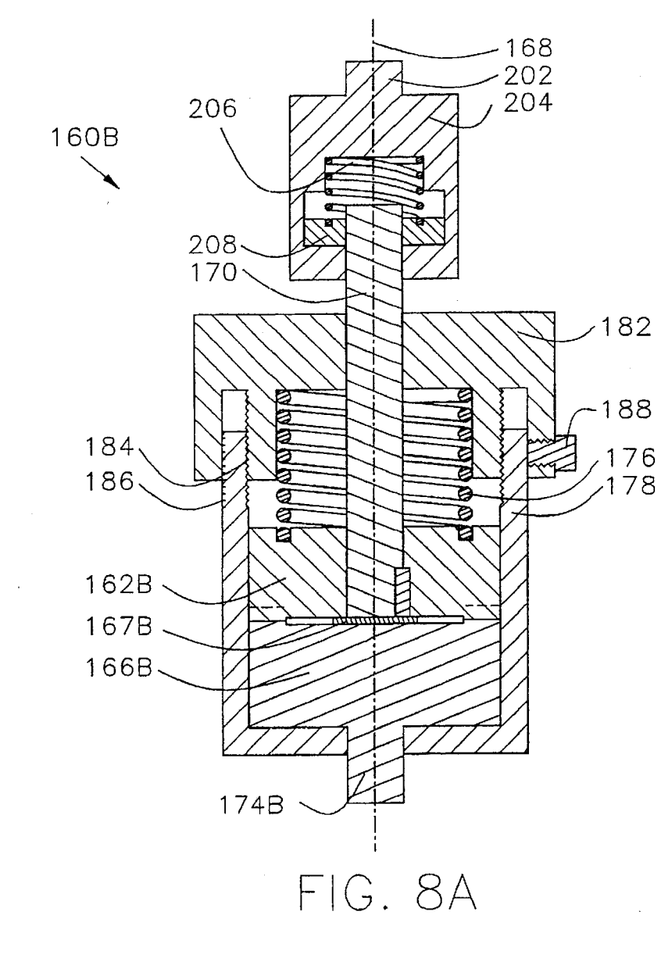
FIG. 8A is an elevational view, in section, of a bevel gear driver embodiment without an intermediate bevel gear assembly.

FIG. 8A discloses another alternative bevel gear driver arrangement 160B wherein the intermediate bevel gear assembly is absent but which includes a torque limit adjustment mechanism as may be conveniently hand-held. This embodiment may relate to consumer oriented specifications which may not require the long-lasting features for only occasional or hobby usage. Upper gear 162B directly drives output gear 166B to thereby rotate output shaft 174B up to the torque limit as discussed above. Thrust bearing 167B may be used to reduce friction and for other purposes as discussed hereinbefore. While it is desirable to include the intermediate bevel gear assembly for the reasons discussed above, it is also possible to provide a selectable torque nut driver for removing or tightening fasteners without that assembly. As with the other configurations, the bevel gear driver of FIG. 8A may be used with a battery driven electric motor as may be conveniently hand held. This configuration could also be used with a pneumatic motor and include the pneumatic biasing assembly 230 discussed above as may be more desirable for shop use. Other similar configurations and arrangements in accord with the teachings herein as will be apparent to those skilled in the art after review of the teachings of this specification.

Figure 9A:
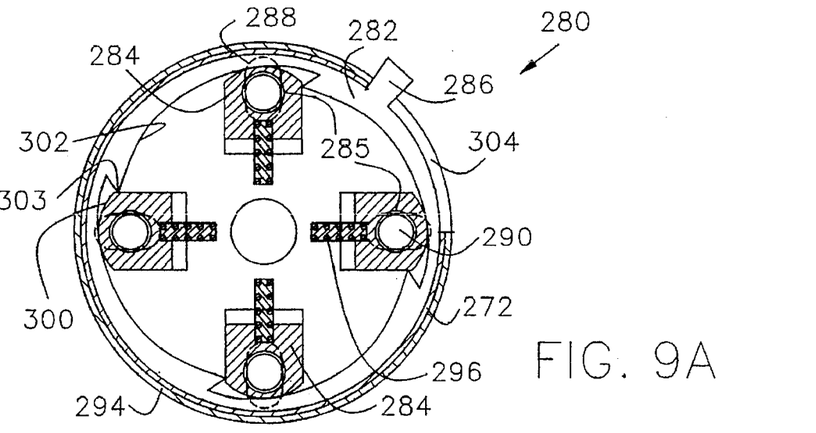
FIG. 9A is a sectional view of the driver of FIG. 9 along line 9A—9A.

FIG. 9 and 9A show a multiple fastener driver 250 that may be used to drive multiple fasteners 252 for simultaneous tightening or loosening. Socket 255 may be adapted to include fastener storage and control means (not shown) for storing and controlling multiple nuts 252 and 253 as might be removed from four tires for subsequent reinstallation. As will be appreciated, simultaneous removal of fasteners could save significant time, for instance, in a business that changes out large numbers of tires each day. If desired, socket 255 could be a standard socket that receives only a single nut 252.

Driver 250 may be used to drive fasteners 252 in the same configuration to different selectable torque levels by coupling plugs, such as coupling plugs 254 and 256, to pressurized gas or fluid at different pressures as may be obtained from system 130 of FIG. 5. The pressurized gas supply obtained from system 130 may also be ramped during the nut driving process to limit torque applied to any particular nut in a fastener configuration to thereby verify that all fasteners are limited to the same torque at all times—a feature that overcomes a problem with prior art devices. It will be noted as discussed hereinbefore, that a ramped pressure remains substantially constant during the short time period in which a moveable gear, such as output gear 262, moves from an engaged position to a disengaged position. A sequencer (not shown) could be used to specially sequence the order of fastener installation by controlling, for instance, the bias from system 130.

The basis of operation of driver 250 is similar to that of driver 10 and 10A shown in FIG.2 - FIG. 4. Input torque is applied to shaft 258 and pinion 260. Pinion 260 drives each output gear 262 at the same rate to thereby torque multiple fasteners 252 simultaneously as may be required for some applications. Each output gear 262 is carried by an associated displaceable gear support member 264 moveable within a respective support member cavity 266.

Coiled flexible drive shafts 268 each individually adjust to lateral movement of the respective output gears 262. Shaft connector members 270 are preferably rotatably secured to outer leg housing 272 and inner leg housing 271 by intermediate bearing members 273 which may be of various types. Intermediate bearing members 273 isolate radial forces on flexible coupling 268 and 292 to prevent interference with displaceable gear support 264 control loading. Inner and outer leg members 271 and 272 are substantially cylindrical (see FIG. 9A) in the present embodiment but could be separate leg members for each fastener shaft 268. Hole 281 may be included to allow torquing operation around a centrally located shaft.

Driver 250 also includes a gauged selector mechanism 280 shown more clearly in FIG. 9A which is a cross-section of FIG. 9 along the line 9A—9A. Gauged selector mechanism 280 allows driver 250 to be used with more than one fastener configuration by movement of fastener adapters 290.

For this purpose, ring 282 is rotatable via control handle 286 to move translatable blocks 284 laterally inwardly or outwardly. Output adapters 290 are then also movable within slots 288 in end member 294 as indicated in FIG. 9A. Antifriction bearings 285 are preferably used to rotatable secure output adapters 290 in translatable blocks 284. As discussed herein before, various lubrication means are preferably provided between moving parts such as blocks and other sliding or rotating surfaces. Flexible coiled fastener drive shafts 292 flex as required to adjust shaft length and orientation to compensate for movement of output adapters 290. Other types of shaft linkage such as universal joints could be used in place of or in conjunction with flexible coiled shafts 268 and 292 as discussed hereinbefore.

Ring 282 is supported by end member 294 that is secured to outer leg housing 272 with connectors 298. Bias springs 296 bias translatable blocks 284, having curved guide surfaces 300, to move along inner ring cam surfaces 302 that determine the lateral orientation of fastener adapters 290. Guide and cam surfaces 302 and 300 may have various shapes as desired. Preferably there is a single point interaction between the surfaces so that translatable blocks 284 follow cam surface 302 more readily. Control handle 286 moves in slot 304 of end member 294 which may be calibrated or marked as desired for various lateral orientations. While end 303 is shown as a point, it could also be square shaped, round or otherwise shaped. Other adjustment mechanisms, such as individually adjustable gauge selector members (not shown) could also be used. Other adjustment paths for fastener adapters 290 defined herein by slots, such as slots 288, could also be used.

FIG. 10 provides another driver 350 embodiment suitable for torquing fasteners in non-circular fastener configurations such as might be suitable for manifold fastener configurations. While various types of gear drives could be use, this particular embodiment uses inner pinion 352 may be used for torque input to drive output gears 353 and to transfer torque via idler gears 354 to outer pinions 356 which, in turn, drive output gears 358. Other drive means could be used. For instance, a centrally disposed elongate worm gear could be used as the principal torque input and transfer means. Such a worm gear could extend across driver 350 from each gear 356 in place of the present gear chain and would tend, at least in this embodiment, to reduce or eliminate gear chatter noise.

As discussed hereinbefore, each output gear 358 is laterally displaceable within a chamber 362 and is supported with displaceable gear support member 364. Fasteners may be simultaneously rotated up to a desired torque limit. The torque limit may vary, it may be ramped, or otherwise controlled as desired between fasteners in the same configuration as discussed hereinbefore. Each air connector 360 is preferably connected to a constant pressure pneumatic supply system such as system 130 shown in FIG. 5 for biasing each respective gear support member 364.

In general, in the various torque drivers discussed, the gear teeth on one or both gears may be modified so as to be short, stubby, and/or rounded to further facilitate this operation as desired. As well, for high speed operation, means could be used to completely disengage the gears after the specified torque is reached and displacement begins if this was desired. However, design of short, stubby, teeth may be more economical than a kick-out mechanism or other such means.

The foregoing disclosure and description of the invention is illustrative and explanatory thereof, and it will be appreciated by those skilled in the art, that various changes in the size, shape and materials as well as in the details of the illustrated construction, reliability configurations, or combinations of features of the various torque driver elements of the present invention may be made without departing from the spirit of the invention.

What is claimed is:

1. A driver for applying torque to a fastener, comprising:

a driver housing;

a first shaft supported by said driver housing and having a first shaft axis extending longitudinally therethrough;

a first gear carried by said first shaft for rotation about said first shaft axis, said first gear having first gear teeth mounted around a circumferential portion thereof;

a second gear disposed within said driver housing for displacement with respect to said first gear in a direction having a component substantially parallel to said first shaft axis between an engaged position and a disengaged position, said second gear having second gear teeth mounted around a circumferential portion thereof, at least one of said first and second gear teeth defining a tooth profile that is angled to produce a separating force in response to torque transfer between said first gear and second gear for moving said second gear with respect to said first gear to said disengaged position to thereby limit torque transferred between said first and second gears and to said fastener;

a variable bias assembly disposed substantially within said driver housing to bias at least one of said first and second gears toward said engaged position, said variable bias assembly including an external adjustment member extending outward of said drive housing for varying said bias; and a bevel gear assembly including a plurality of bevel gears disposed between said first and second gears, each of said plurality of bevel gears being supported on a respective bevel gear shaft, each of said bevel gear shafts having a longitudinal axis substantially transverse with respect to said first shaft axis.

2. The driver of claim 1, wherein:

said longitudinal axis of each of said bevel gear shafts is fixed with respect to said driver housing.

3. The driver of claim 1, wherein:

each of said plurality of bevel gears is mounted at a fixed spacing with respect to another of the plurality of bevel genes and with respect to a circumference of the first gear.

4. The driver of claim 1, wherein:

each of said plurality of bevel gears meshes with both said first gear and said second gear when said first and second gears are in said engaged position.

5. A driver for applying torque to a fastener, comprising:

a driver housing;

a first shaft supported by said driver housing and having a first shaft axis extending longitudinally therethrough;

a first gear carried by said first shaft for rotation about said first shaft axis, said first gear having first gear teeth mounted adjacent a circumferential portion thereof;

a second gear disposed within said driver housing, said second gear having second gear teeth mounted adjacent a circumferential portion thereof, at least one of said first and second gears being a displaceable gear displaceable with respect to the other between an engaged position and a disengaged position in a direction having a component substantially parallel to said first shaft axis, at least one of said first and second gear teeth defining a tooth profile that is angled to produce a separating force in response to torque transfer between said first gear and second gear for moving said displaceable gear with respect to the other to said disengaged position to thereby limit torque transferred between said first and second gears and to said fastener;

a variable bias assembly disposed substantially within said driver housing to bias at least one of said first and second gears toward said engaged position, said variable bias assembly including an external adjustment member extending outward of said drive housing for varying said bias; and an axial clutch to prevent torque transfer to said fastener in response to an axial force substantially parallel to said first shaft axis and greater than a selected axial force limit.

6. The driver of claim 5, wherein said clutch further comprises:

an axial clutch housing having internal splines;

a splined member movable axially along said internal splines of said axial clutch housing between an engaged position and a disengaged position; and a bias member to bias said splined member into said engaged position with respect to said axial clutch housing.

7. The driver of claim 6, wherein:

said first shaft is secured to said splined member to move said splined member axially to said disengaged position in response to said axial force greater than said selected axial force limit.

8. A driver for applying torque to a fastener, comprising:

a driver housing;

a first shaft supported by said driver housing and having a first shaft axis extending longitudinally therethrough;

a first gear carried by said first shaft for rotation about said first shaft axis, said first gear having first gear teeth mounted adjacent a circumferential portion thereof;

a second shaft supported by said driver housing and having a second shaft axis extending longitudinally therethrough whereby said first shaft axis and said second shaft axis are substantially coaxial;

a second gear carried by said second shaft, said second gear having second gear teeth mounted adjacent a circumferential portion thereof, said second gear being moveable with respect to said first gear in a direction having a component parallel to said second shaft axis between an engaged position and a disengaged position, at least one of said first and second gear teeth defining an angled tooth profile to produce a separating force in response to torque transfer between said first gear and second gear for relative movement between said first and second gears from said engaged position to disengaged position to thereby limit torque transferred between said first and second gears and to said fastener;

a calibrated variable bias assembly substantially disposed within a cavity internal of said driver housing to bias at least one of said first and second gears toward said engaged position, said variable bias assembly including an external adjustment member disposed external of said cavity for varying said bias to produce a selectable calibrated limit for torque applied to said fastener with said driver; and an intermediate gear disposed between said first and second gears.

9. A driver for applying torque to a fastener, comprising:

a driver housing;

a first shaft supported by said driver housing and having a first shaft axis extending longitudinally therethrough;

a first gear carried by said first shaft for rotation about said first shaft axis, said first gear having first gear teeth mounted adjacent a circumferential portion thereof;

a second sham supported by said driver housing and having a second shaft axis extending longitudinally therethrough;

a second gear carded by said second shaft, said second gear having second gear teeth mounted adjacent a circumferential portion thereof, said second gear being moveable with respect to said first gear in a direction having a component parallel to said second shaft axis between an engaged position and a disengaged position, at least one of said first and second gear teeth defining an angled tooth profile to produce a separating force in response to torque transfer between said first gear and second gear for relative movement between said first and second gears from said engaged position and said disengaged position to thereby limit torque transferred between said first and second gears and to said fastener;

a calibrated variable bias assembly substantially disposed within a cavity internal of said driver housing to bias at least one of said first and second gears toward said engaged position, said variable bias assembly including an external adjustment member disposed external of said cavity for varying said bias to produce a selectable calibrated limit for torque applied to said fastener with said driver; and a clutch responsive to an axial force substantially parallel to said first shaft axis to prevent transfer of torque to said fastener.

* * * * *